United States Patent Office 3,361,722
Patented Jan. 2, 1968

3,361,722
COPOLYMERS OF CYCLOBUTENE-1,2-DICYANIDE
Dorothy C. Prem and June T. Duke, Maple Heights, and Janice L. Greene, Warrensville Heights, Ohio, assignors to The Standard Oil Company, Cleveland, Ohio, a corporation of Ohio
No Drawing. Filed June 10, 1964, Ser. No. 374,192
9 Claims. (Cl. 260—78.5)

ABSTRACT OF THE DISCLOSURE

Resinous addition interpolymers of cyclobutene-1,2-dicyanide, a vinyl aromatic hydrocarbon such as styrene and optionally another monovinyl monomer or monomers and a process for preparing them are described.

---

This invention relates to copolymers of cyclobutene-1,2-dicyanide and one or more copolymerizable alkenyl monomers and to the process for preparing said copolymers.

Cyclobutene-1,2-dicyanide and a method for preparing it are more fully disclosed and claimed in the copending U.S. patent application of Janice L. Greene, Norman W. Standish and Nancy R. Gray, Serial No. 312,313, filed September 30, 1963, now U.S. 3,275,676. This new monomer is believed to have the structure

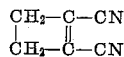

We have discovered that cyclobutene-1,2-dicyanide will copolymerize with a vinyl aromatic monomer to produce useful polymeric products. The copolymers of this invention are useful as molding resins, coating materials, adhesives, and in blends with other known polymeric materials such as thermoplastics, rubbers, and the like. The copolymers of this invention are particularly useful for blending with elastomers such as natural rubber, polybutadiene, rubbery butadiene-styrene copolymers and the like because such blends have increased modulus and hardness. The vinyl aromatic monomers useful in this invention are those having at least one polymerizable vinyl group and they include styrene, alpha-methyl styrene, the vinyl toluenes, the vinyl xylenes, divinyl benzene, vinyl ethyl benzene, trivinyl benzene, tetravinyl benzene, divinyl ethyl benzene, vinyl naphthalene, vinyl phenanthrene, divinyl naphthalene, and the like, halogenated vinyl aromatic monomers such as chlorostyrene, dichlorostyrene, vinyl benzamide, vinyl benzene sulfonates and salts thereof; the vinyl pyridines such as 2-vinyl pyridine, 4-vinyl pyridine, N-vinyl carbazole, N-vinyl pyrrolidone, and the like. Most preferred vinyl aromatic monomers for the purpose of this invention are the vinyl aromatic hydrocarbons having from 8 to 20 carbon atoms and having at least one vinyl group per molecule, said vinyl group being attached directly to the aromatic nucleus.

Other monomers which can be employed in minor proportions in the present interpolymerization process with cyclobutene-1,2-dicyanide and the vinyl aromatic monomer component include one or more of the following monoalkenyl monomers: the vinyl halides, such as vinyl chloride, vinyl bromide, vinyl fluoride, vinylidene chloride, dichlorodifluoroethylene, chlorotrifluoroethylene, and the like; vinyl esters, such as vinyl acetate, vinyl propionate, vinyl butyrate, vinyl chloroacetate, vinyl chloropropionate, vinyl benzoate, vinyl chlorobenzoate, vinyl laurate, and others; the acrylic and alpha-alkyl acrylic acids, their esters, their amides and their nitriles, such as acrylic acid, chloroacrylic acids, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N-N-dimethyl acrylamide, N-t-butyl acrylamide, N-methylol acrylamide, N-octyl acrylamide, acrylonitrile, alpha-chloroacrylonitrile, methacrylamide, N - methyl methacrylamide, N - methylol methacrylamide, N - octyl methacrylamide, methacrylonitrile, ethacrylonitrile, and others; esters of maleic and fumaric acids, such as dimethyl maleate, diethyl maleate, diethyl fumarate, dibutyl fumarate, maleic anhydride, maleic acid, fumaric acid, itaconic acid, and others; vinyl ethers and vinyl ketones such as vinyl methyl ether, vinyl ethyl ether, vinyl butyl ether, 2-chloroethyl vinyl ether, vinyl benzyl ether, methyl vinyl ketone, ethyl vinyl ketone, isobutyl vinyl ketone, methyl isopropenyl ketone, isoamyl vinyl ketone, phenyl vinyl ketone, benzyl vinyl ketone, cyclohexyl vinyl ketone, and the like, monoolefins, such as ethylene, propylene, isobutylene, the amylenes, the hexylenes, cyclohexenes, and others; other monomers such as ethyl methylene malonate, allyl acetate, allyl propionate, methallyl acetate, and various other readily polymerizable compounds containing an olefinic double bond and especially those containing the $CH_2=C<$ group.

In addition to the foregoing monomers, there also may be employed in the preparation of the interpolymer of cyclobutene-1,2-dicyanide and vinyl aromatic monomer embodied herein one or more monomeric materials having a plurality of $>C=C<$ groupings wherein the said groupings are separated from one another by at least one intervening atom, and such materials include allyl esters such as diallyl phthalate, diallyl isophthalate, diallyl terephthalate, diallyl adipate, diallyl succinate, triallyl citrate, diallyl maleate, diallyl itaconate, diallyl oxalate, diallyl glutarate, diallyl fumarate, dimethallyl phthalate, allyl acrylate, allyl methacrylate, methallyl acrylate, methallyl methacrylate, polyallyl ethers of polyhydric alcohols, such as diallyl ethylene glycol, trimethallyl glycerol, tetraallyl pentaerythritol, polyallyl sorbitol, polyallyl inositol, polyallyl raffinose, and others; vinyl esters such as divinyl fumarate, vinyl acrylate, vinyl methacrylate, isopropenyl acrylate, and others; vinyl ethers of polyhydric alcohols including divinyl ethylene glycol, the divinyl ether of cyclohexane diol, trivinyl glycerol, tetravinyl pentaerythritol, polyvinyl ethers of sucrose, polyvinyl ethers of glucose, polyvinyl ethers of starch, and others; acrylic esters of polyhydric alcohols, such as ethylene glycol diacrylate, ethylene glycol dimethacrylate, glycerol trimethacrylate, polyacrylate esters of sucrose, glucose, raffinose, mannitol, and the like; triallyl cyanurate, triacrylyl hexahydrotriazine, trimethacrylyl hexahydrotriazine, hexaallyl trimethylene trisulfone, diallyl melamine, methylene-bis-acrylamide, methylene-bis-methacrylamide, triallyl phosphate, diallyl benzene phosphonate, diallyl propene-1-phosphonate, tetraallyl silane, tetraallyl tin, tetravinyl germane, diallyl divinyl silane, triallyl vinyl tin, 1,5-hexadiene, 1,7-octadiene, 1,8-nonadiene, diisopropenyl benzene, tetraallyl methane, tetramethallyl methane, tetravinyl methane, and others.

The interpolymers of this invention can be prepared in bulk, solvent, emulsion or suspension types of polymerization procedures. It is preferred that the copolymerization process be carried out in the substantial absence of molecular oxygen, preferably in the presence of an inert gas such as nitrogen, helium, carbon dioxide, and the like.

The copolymerization process preferably utilizes a free-radical initiator such as the peroxygen compounds including acetyl peroxide, benzoyl peroxide, hydrogen peroxide, t-butyl hydroperoxide, dicumyl peroxide, and the like; the azo initiators, such as azobisisobutyronitrile and the like. The copolymerization may also be initiated by heat or other radiant energy such as ultra-violet light, X-rays, nuclear radiation, and the like.

The preferred polymers embodied in this invention are those composed of units derived from the polymerization of a mixture of (1) from about 10 to 70% by weight of cyclobutene-1,2-dicyanide, (2) from about 30 to 90% by weight of at least one vinyl aromatic monomer and (3) from about 0 to 60% by weight of at least one other vinyl monomer which is copolymerizable with (1) and (2). More preferred are the foregoing polymers wherein the (3) monomer is a monovinyl monomer. In the above-described proportions of the various monomers, it is to be understood that when a maximum amount of one monomer is employed in the polymerization mixture that the relative proportions of the remaining monomers must be adjusted so that the combined weight percentage of monomers used in any single case will total substantially 100%.

The polymers embodied in this invention may be prepared by mass or bulk, solution or dispersion polymerization techniques and preferably are prepared in an aqueous medium in the presence of a suitable polymerization catalyst in the range of from about 20 to 60% total solids by either batch or incremental addition of one or more of the ingredients. The aqueous medium may be emulsifier free or it may contain an emulsifier. Suitable emulsifiers include organic sulfates and sulfonates such as sodium lauryl sulfate, the alkali metal salts of sulfonated petroleum or paraffin oils, the sodium salts of aromatic sulfonic acids such as the sodium salt of naphthalene sulfonic acids, the sodium salts of dodecane-1-sulfonic acid, octadecane-1-sulfonic acid, etc.; the polyallyl and polyalkanyl alkoxylene phosphonate acids and salts more fully described in U.S. Patent No. 2,853,471, and the like; aralkyl sulfonates such as sodium isopropyl benzene sulfonate, sodium dodecyl benzene sulfonate and sodium isobutyl naphthalene sulfonate; alkali metal salts of sulfonated dicarboxylic acid esters and amides such as sodium dioctyl sulfosuccinate, sodium N-octadecyl succinamate, and the like, and others. The so-called cationic emulsifiers such as the salts of strong inorganic acids and organic bases containing long carbon chains; for example, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfuric esters and others may be used. In addition to the above and other polar or ionic emulsifiers, still other materials which may be used singly or in combination with one or more of the above types of emulsifiers include the so-called "nonionic" emulsifiers such as the polyether alcohols prepared by condensing ethylene or propylene oxide with higher alcohols, the fatty alkylol amine condensates, the diglycol esters of lauric, abic and stearic acids, and others. It is often desirable to add post-polymerization emulsifiers to the latices embodied herein for improved stability.

Particularly preferred as polymerization initiators are the water-soluble peroxygen compounds such as hydrogen peroxide and the sodium, potassium and ammonium persulfates, the water-soluble oxidation-reduction or "redox" types of catalysts, and the heavy metal activated, water-soluble peroxygen and redox catalysts. The preferred range of catalyst is from about 0.01 to about 3 parts by weight per one-hundred parts by weight of the monomer component.

It may also be desirable to incorporate from about 0.1 to 5% by weight of an antioxidant or a mixture of antioxidants such as the hindered phenols and diaryl amines into the latex or into the coagulated polymers embodied herein.

Although the polymerization may be carried out in the presence of oxygen or air, the rate of reaction is ordinarily faster in the absence of oxygen and hence, polymerization in an evacuated vessel, at reflux, or under an inert atmosphere such as nitrogen, helium or $CO_2$ is preferred. The temperature at which the polymerization is carried out is not critical, it may be varied widely from −30° C. to 100° C. or higher, though best results are generally obtained at a temperature of from about 0° C. to about 70° C.

Other polymerization techniques and practices conveniently employed in the preparation of styrene copolymers may also be used in the polymerization of the monomer mixtures herein described. For example, the use of mercaptan modifiers in the reaction mixture is often desirable and results in lower raw polymer viscosity and other allied plastic properties.

In the following examples which will illustrate the process and some specific compositions embodied in this invention, the amounts of ingredients used are expressed in parts by weight unless otherwise indicated.

*Example I*

A copolymer of cyclobutene-1,2-dicyanide and styrene was prepared by reacting in the substantial absence of oxygen at 60° C. for about 6 hours at a pH of 8.0 the following mixture:

| | |
|---|---|
| Cyclobutene-1,2-dicyanide | 50.0 |
| Styrene | 50.0 |
| Potassium persulfate | 0.26 |
| n-Dodecyl mercaptan | 0.50 |
| Daxad-11 [1] | 0.10 |
| Sodium lauryl sulfate | 2.50 |
| Water | 180.0 |

[1] Sodium salt of a condensed alkyl aryl sulfonic acid, Dewey & Almy Chemical Company.

A conversion of 90.5% of monomers to polymer was achieved in this time as determined by total solids measurement. The resinous polymer was found by infrared analysis to be a copolymer of styrene and cyclobutene-1,2-dicyanide. Test bars of the polymer were molded and the polymer was found to be an excellent molding resin. The powdered copolymer was blended on the mill with a rubbery copolymer of acrylonitrile and butadiene and the resulting blend was stiffer and tougher than the original acrylonitrile-butadiene copolymer.

*Example II*

A copolymer resembling that described in Example I was prepared by the bulk polymerization of cyclobutene-1,2-dicyanide and styrene using the following polymerization mixture:

| | |
|---|---|
| Cyclobutene-1,2-dicyanide | 50.0 |
| Styrene | 50.00 |
| Azobisisobutyronitrile | 0.50 |

The polymerization reaction was carried out for 30 hours at 60° C. The pale yellow, solid polymer was isolated in 100% yield and both infrared and nuclear magnetic resonance measurements on the polymer indicated that it indeed was a copolymer of cyclobutene-1,2-dicyanide and styrene. Similar results were obtained when alpha-methyl styrene was used in place of all or part of the styrene in this example. These copolymers were found to act as adhesives when applied from the melt or from solution in an organic solvent.

*Example III*

An interpolymer of cyclobutene-1,2-dicyanide, styrene and divinyl benzene was prepared in a manner similar to that described in Example I from the following mixture of ingredients:

| | |
|---|---|
| Cyclobutene-1,2-dicyanide | 50.0 |
| Styrene | 50.0 |
| Divinyl benzene | 0.50 |
| Potassium persulfate | 0.26 |
| n-Dodecyl mercaptan | 0.50 |
| Daxad-11 | 0.10 |
| Sodium lauryl sulfate | 2.50 |
| Water | 180.0 |

The polymerization mixture was adjusted to a pH of about 7. A resinous interpolymer resulted in greater than 90% conversion.

*Example IV*

An interpolymer was prepared from cyclobutene-1,2-dicyanide, alpha-methyl styrene and methacrylonitrile in a manner similar to that described in Example III from the following polymerization mixture:

| | |
|---|---|
| Cyclobutene-1,2-dicyanide | 10.0 |
| Alpha-methyl styrene | 54.0 |
| Methacrylonitrile | 36.0 |
| Potassium persulfate | 0.26 |
| n-Dodecyl mercaptan | 0.50 |
| Daxad-11 | 0.10 |
| Sodium lauryl sulfate | 2.50 |
| Water | 180.0 |

The polymer formed in 50% conversion and the presence of a terpolymer was confirmed by I.R. analysis.

We claim:
1. The resinous addition interpolymer composed of units derived from
    (1) from about 10 to 70% by weight of cyclobutene-1,2-dicyanide,
    (2) from about 30 to 90% by weight of at least one vinyl aromatic hydrocarbon having from 8 to 20 carbon atoms, and
    (3) from about 0 to 60% by weight of at least one other monovinyl monomer which is copolymerizable with (1) and (2).

2. The resinous addition interpolymer of claim 1 wherein the vinyl aromatic hydrocarbon is styrene.
3. The resinous addition interpolymer of claim 1 wherein the vinyl aromatic hydrocarbon is alpha-methyl styrene.
4. The resinous addition interpolymer of claim 1 wherein the vinyl aromatic hydrocarbon is divinyl benzene.
5. The resinous addition interpolymer of claim 1 wherein the other monovinyl monomer is methacrylonitrile.
6. The process comprising addition polymerization of a mixture of
    (1) from about 10 to 70% by weight of cyclobutene-1,2-dicyanide,
    (2) from about 30 to 90% by weight of at least one vinyl aromatic monomer, and
    (3) from about 0 to 60% by weight of at least one other vinyl monomer copolymerizable with (1) and (2).
7. The process of claim 6 carried out in an aqueous emulsion in the presence of an emulsifier.
8. The process of claim 7 carried out at a temperature of from about 0° C. to about 70° C.
9. The process of claim 8 wherein from about 0.01 to about 5 parts by weight per one hundred parts by weight of the monomer content of a free radical catalyst is employed.

No references cited.

JOSEPH L. SCHOFER, *Primary Examiner.*

S. M. LEVIN, *Assistant Examiner.*